United States Patent
Lawlor

(10) Patent No.: US 6,263,660 B1
(45) Date of Patent: Jul. 24, 2001

(54) APPARATUS AND METHOD FOR FUEL-AIR MIXING BEFORE SUPPLY OF LOW PRESSURE LEAN PRE-MIX TO COMBUSTOR FOR ROTATING RAMJET ENGINE DRIVING A SHAFT

(75) Inventor: Shawn P. Lawlor, Redmond, WA (US)

(73) Assignee: Ramgen Power Systems, Inc., Bellevue, WA (US)

( * ) Notice: Subject to any disclaimer, the term of this patent is extended or adjusted under 35 U.S.C. 154(b) by 0 days.

(21) Appl. No.: 09/376,159

(22) Filed: Aug. 17, 1999

Related U.S. Application Data

(63) Continuation-in-part of application No. 09/149,728, filed on Sep. 8, 1998
(60) Provisional application No. 60/096,831, filed on Aug. 17, 1998.

(51) Int. Cl.[7] .................................................. F02C 3/14
(52) U.S. Cl. ...................... 60/39.02; 60/39.35; 60/270.1; 60/737
(58) Field of Search ................................ 60/39.02, 39.34, 60/39.35, 261, 270.1, 737, 749; 239/399; 431/9

(56) References Cited

U.S. PATENT DOCUMENTS 2,770,501 * 11/1956 Coanda ................................ 239/429
2,780,916 * 2/1957 Collins ................................ 60/270.1

(List continued on next page.)

FOREIGN PATENT DOCUMENTS

| 3819899 C1 | 11/1989 | (DE) . |
| 0 793 010 A1 | 9/1997 | (EP) . |
| 0 936 406 A2 | 8/1999 | (EP) . |
| WO96/41073 | 12/1996 | (WO) . |
| WO 98/27330 | 6/1998 | (WO) . |

OTHER PUBLICATIONS

Briedenthal et al, American Institute of Aeronautics and Astronautics, AIAA Paper 85–1600, 1986.

Primary Examiner—Ted Kim
(74) Attorney, Agent, or Firm—R. Reams Goodloe, Jr.

(57) ABSTRACT

Fuel air mixing apparatus, and a method for design and operation of fuel-air mixing apparatus. An axial inlet air fan provides inlet air to an annular passageway having therein fuel supply structures through which fuel such as low pressure natural gas is injected. Vortex generators on the fuel supply structures create vortices to mix the inlet air with the injected fuel. Mixing is provided according to a pre-selected formula to control the ratio of transverse momentum to axial momentum, to thoroughly mix the fuel and the air, so as to provide a uniformly mixed inlet gas stream. This stream is fed to an unshrouded ramjet inlet which captures and compresses the mixed inlet gas stream by utilizing inlet structures and an adjacent housing sidewall structure. Fuel is oxidized in the combustion chamber(s) to produce expanding combustion gases. Such gases escape out through a ramjet nozzle, acting against outlet structures and an adjacent housing sidewall, rotating the ramjet at supersonic velocities, and producing shaft energy. Efficient mixing of the oxidant and fuel prior to entry into the ramjet combustor, and the short residence times in the combustion chamber, minimize the formation of undesirable oxides of nitrogen.

65 Claims, 9 Drawing Sheets

U.S. PATENT DOCUMENTS

| | | | | |
|---|---|---|---|---|
| 3,035,410 | * | 5/1962 | Foulon | 60/270.1 |
| 3,118,276 | * | 1/1964 | Keenan | 60/261 |
| 3,172,253 | * | 3/1965 | Schelp et al. | 60/270.1 |
| 3,176,465 | * | 4/1965 | Colley | 60/749 |
| 3,315,468 | * | 4/1967 | Vdoviak | 60/749 |
| 3,893,297 | * | 7/1975 | Tatem, Jr. et al. | 60/224 |
| 4,887,425 | * | 12/1989 | Vdoviak | 60/261 |
| 4,951,463 | | 8/1990 | Lee et al. | 60/270 |
| 4,981,368 | | 1/1991 | Smith | 366/337 |
| 5,038,558 | | 8/1991 | Sohma et al. | 60/39.06 |
| 5,203,796 | * | 4/1993 | Washam et al. | 60/737 |
| 5,319,935 | | 6/1994 | Toon et al. | 60/733 |
| 5,351,477 | | 10/1994 | Joshi et al. | 60/39.463 |
| 5,437,159 | * | 8/1995 | Ansart et al. | 60/746 |
| 5,626,017 | * | 5/1997 | Sattlemayer | 60/723 |
| 5,709,076 | * | 1/1998 | Lawlor | 60/39.35 |
| 5,865,025 | | 2/1999 | Peres et al. | 60/267 |
| 5,941,064 | * | 8/1999 | Chevalier et al. | 60/270.1 |

* cited by examiner $C'$ = RMS CONCENTRATION
$\overline{C}$ = MEAN CONCENTRATION
$J$ = MOMENTUM RATIO OF TRANSVERSE JETS TO LONGITUDINAL FLOW
$x$ = DOWNSTREAM DISTANCE FROM NOZZLE EXIT
$D$ = MIXING CELL HEIGHT

APPARATUS AND METHOD FOR FUEL-AIR MIXING BEFORE SUPPLY OF LOW PRESSURE LEAN PRE-MIX TO COMBUSTOR FOR ROTATING RAMJET ENGINE DRIVING A SHAFT

This application claims the benefit of U.S. Provisional Application No. 60/096,831 filing date Aug. 17, 1998.

This application is a continuation-in-part of copending application Ser. No. 9/149,728 filed on Sep. 8, 1998.

A portion of the disclosure of this patent document contains material which is subject to copyright protection. The owner has no objection to the facsimile reproduction by anyone of the patent document or the patent disclosure, as it appears in the Patent and Trademark Office patent file or records, but otherwise reserves all copyright rights whatsoever.

TECHNICAL FIELD OF THE INVENTION

My invention relates to an apparatus for high efficiency fuel-air mixing, and to the novel combination of such fuel-air mixing arrangements with the low pressure supply of fuel to a rotary ramjet engine power plant. More particularly, my invention relates to a unique combination of structures in the inlet air supply for a rotary ramjet engine, as particularly advantageous in achieving thorough lean pre-mixing of fuel and air which is necessary to minimize emission of nitrogen oxides.

BACKGROUND OF THE INVENTION

A continuing demand exists for a simple, highly efficient and inexpensive thermal power plant which can reliably provide low cost electrical and mechanical power. This is because many electrical and/or mechanical power plants could substantially benefit economically from a prime mover that offers significantly improved cycle efficiencies. This is particularly true in medium size power plants—generally in the 10 to 100 megawatt range—which are used in many industrial applications, including stationary electric power generating units, rail locomotives, and marine power systems.

Medium sized power plants are also well suited for industrial and utility cogeneration facilities. Such facilities are increasingly employed to service thermal power needs while simultaneously generating electrical power in a cost effective manner. Power plant designs which are now commonly utilized in co-generation applications include (a) gas turbines, driven by the combustion of natural gas, fuel oil, or other fuels, which capture the thermal and kinetic energy from the combustion gases, (b) steam turbines, driven by the steam which is generated in boilers from the combustion of coal, fuel oil, natural gas, solid waste, or other fuels, and (c) large scale reciprocating engines, usually diesel cycle and typically fired with fuel oils.

Of the currently available power plant technologies, diesel fueled reciprocating and advanced aeroderivative gas turbine engines have the highest efficiency levels. Unfortunately, with respect to the reciprocating engines, at higher power output levels, the size of the individual engine components required become almost unmanageably large, and as a result, commercial use of single unit reciprocating engine systems in larger sizes has been minimal.

Gas turbines perform more reliably than reciprocating engines, and thus are in widespread use. However, because gas turbines are only moderately efficient in converting fuel to electrical energy, gas turbine powered plants are most effectively employed in co-generation systems where both electrical and thermal energy can be utilized. In that manner, the gas turbine efficiency can be counterbalanced by using the thermal energy to increase the overall cycle efficiency.

In any event, and particularly in view of reduced governmental regulation in the sale of electrical power, it can be appreciated that significant cost reduction in electrical power generation would be desirable. This objective can be most effectively accomplished by generating electrical power at higher overall cycle efficiency than is achieved with technology currently utilized for power generation.

One of the technical challenges in providing a high efficiency combustion engine is the ability to achieve low emissions of undesirable nitrogen oxides, i.e., to minimize "NOx" production. Also, to achieve stable, uniform combustion temperatures, it is desirable to provide a method to easily control and maintain uniformity in concentration of fuel in fuel-air mixtures. This is particularly helpful in avoidance of flame temperature variations, to thus avoid hot spots and accompanying potential adverse effects with respect to the hot zone cooling technology and metallurgy.

In gas turbine technology, it is well known that combustion at lean fuel-air ratios is effective in reducing the formation of oxides of nitrogen ("NOx"). However, since gas turbines inject fuel into combustors after the inlet combustion air has been compressed, the fuel must be introduced to the gas turbine combustor under pressure. Also, pressure in such fuel supply line is often utilized to assist mixing of the fuel with the compressed air, by inserting a high momentum fuel jet into the combustion chamber, so that in the resulting mixture, the incoming fuel is very well mixed with the compressed air. However, if through mixing did not occur, the result would be a fuel-air mixture which at various points was richer than optimum for achieving low NOx performance.

In contrast, in my rotary ramjet based power plant, the necessary inlet air compression to support combustion in the ramjet occurs only along the inlet ramp of the ramjet. In my ramjet engine, it is unnecessary to expend energy for the compression of gaseous fuels. Therefore, high pressure fuel, and accompanying high momentum fuel injection jets, are not normally available to promote mixing of the fuel with the air, since the compression of gaseous fuels is not otherwise necessary.

It is therefore desirable to provide a fuel-air mixing housing capable of reliably and uniformly mixing low pressure fuel and the supplied inlet air to provide a uniform, consistent composition lean fuel-air mixture.

SUMMARY OF THE INVENTION

I have now invented a novel, improved rotary ramjet based power plant which uses as one important component an air-fuel pre-mix housing utilizing fuel supply structures in the shape of low aerodynamic drag stators with strategically located fuel injection outlets, and with vortex generators to generate transverse momentum as necessary to assure thorough fuel-air mixing. In such apparatus, fuel air mixing is conducted at or near ambient pressure, and at the ambient (or any desired) incoming temperature. Thus, fuel-air mixing is reliably completed prior to being fed to the combustor. This apparatus, and the method used to reliably design such apparatus, result in the uniform, lean fuel-air pre-mix conditions necessary to reliably achieve low NOx emissions during power plant operation.

Also, by use of a metered fuel feed apparatus, the power output of the ramjet power plant can be turned down as necessary to maintain the desired rotating velocity. In this manner, a constant rotating velocity can be achieved, as is necessary in synchronous power generation apparatus.

To achieve the desired power plant operational parameters, I have now developed a novel fuel-air mixing housing which uses an axial supply fan design and which introduces a lean, uniformly mixed fuel-air mixture to a transverse mounted ramjet engine configuration. This apparatus overcomes some specific problems inherent in the heretofore known apparatus and methods that are known to me and which have heretofore been proposed for the application of ramjet technology to stationary power generation equipment. Of primary importance, I have now developed a simple, low speed, essentially ambient pressure air supply apparatus which can deliver a stabilized, smoothly flowing oxidant carrier gas to a housing for thorough mixing with a gaseous fuel which is supplied at low pressure. Preferably, fuel is injected at relatively low velocity into the air supply stream, and the fuel and air are thoroughly mixed by using a plurality of vortex generators to create swirling vortices, so that a uniformly mixed fuel-oxidant mixture is supplied to the ramjet inlet. Resultingly, efficient and clean combustion of the supplied fuel is achieved.

More specifically, my novel fuel-air pre-mix housing receives an inlet carrier gas such as air which carries an oxidant such as oxygen, and thoroughly mixes the carrier gas with a selected fuel such as natural gas. The housing, and the process employed therein, thoroughly mixes the fuel and the oxidant to produce a fuel-oxidant of uniform mixture. Overall, the housing provides a convergent gas flow path, that is, of lower cross-sectional area at the outlet as compared to the inlet. Preferably, the outlet of the fuel-air pre-mix housing is substantially annular, and sized to match the inlet of the transversely mounted ramjet engine. The gas flow path in the fuel-air pre-mix housing has a longitudinal axis. The gas flow path is defined by (i) an upstream housing end, (ii) a downstream housing end, (iii) an outer surface of an inner wall, and (iv) an inner surface of an outer wall. A plurality of fuel supply structures are disposed in fluid communication with the gas flow path and each of the fuel supply structures has a fuel inlet and a fuel injection outlet. Preferably, the fuel supply structures have low aerodynamic drag bodies with a fuel conduit defined therein for transfer of the fuel between the fuel inlet and the fuel injection outlet in each fuel supply structure. A plurality of vortex generators are fixedly mounted within the carrier gas flow path, in proximity to the fuel injection outlets, and preferably mounted on the body of the fuel supply structures. The vortex generators are mounted to protrude into the gas flow path and positioned so as to deflect a portion of the inlet carrier gas and thereby convert a portion of the axial momentum of the inlet carrier gas to transverse momentum, to thereby create vortices which effect efficient mixing between the inlet carrier gas and the injected fuel. Most preferably, the fuel supply structures are mounted radially in spoke-like fashion spanning all or a portion of the gap between the outer surface of the inner wall and the inner surface of the outer wall. For effective air flow stabilization, the number of fuel supply structures (stators) must be commensurate with the geometry involved in view of the mixing criteria described herein. However, for one configuration depicted herein, where the annular inlet duct has diameter at the inner surface of the outer wall of about 72 inches, and a diameter at the outer surface of the inner wall of about 48 inches, the number of fuel supply structures (stators) is preferably up to about 30 or so. Also, each stator preferably spans a substantial portion of the gap, or more preferably extend fully between the gap between the outer surface of the inner wall and the inner surface of the outer wall.

The process for operation of my fuel-air pre-mix housing to thoroughly mix an inlet carrier gas containing oxidant and fuel involves introducing a carrier gas containing an oxidant into the gas flow path substantially along the longitudinal axis at a preselected velocity. Then, a fuel is introduced into the fuel supply structures at a pre-selected pressure, and then a pre-selected amount of the fuel is injected at a pre-selected velocity into said carrier gas from the fuel injection outlets. The vortex generators are utilized to convert a pre-selected portion of the axial momentum possessed by the carrier gas moving at the preselected velocity into transverse momentum, by creating vortices. The design criteria selects a mixing length $X_M$ and a characteristic mixing cell height D, so that the vortex generator size, given the momenta of the inlet carrier gas and the injected fuel, provide the result that the ratio of the rms concentration c' of the fuel to the average concentration c of the fuel in the carrier gas is about 0.1 or less. In other words, the peak concentration of fuel is within plus or minus 10% of the average. Preferably, a ratio of about 0.08 is achieved, so that the peak concentration of fuel is within plus or minus 8% of the average. Still more preferably, a ratio of about 0.06 is achieved, so that the peak concentration of fuel is within plus or minus 6% of the average fuel concentration in the lean fuel-air pre-mix. By careful selection of passageway sizing, velocities of the carrier gas, the injected fuel, and the vortex generators, the fuel may be easily supplied at less than 30 psig, and more preferably at less than about 15 psig, while still accomplishing the mixing entirely at ambient pressure.

The thoroughly mixed lean fuel-air mixture is supplied to the inlet of two or more transversely mounted ramjets. The ramjets are preferably provided in an unshrouded construction. Each ramjet is situated so as to engage and to compress the mixed inlet gas stream which is impinged by the ramjet upon its rotation about the aforementioned axis of rotation. Combustion of well mixed fuel occurs in the rotary ramjet combustor. The hot combustion gases formed by oxidation of the fuel escape rearwardly from the ramjet nozzle, thrusting the ramjet tangentially about the axis of rotation, i.e., it rotates the rotor and associated output shaft. The power generated by the turning output shaft portions may be used directly in mechanical form, or may be used to drive an electrical generator and thus generate electricity. By use of my novel fuel-air pre-mix apparatus, uniformly low emission levels of oxides of nitrogen can be achieved, and overall efficiency of the engine is enhanced by lean mixture operation.

OBJECTS, ADVANTAGES, AND FEATURES OF THE INVENTION

From the foregoing, it will be apparent to the reader that one important and primary object of the present invention resides in the provision of a novel fuel-air mixing chamber which can be cost effectively utilized for creating a uniform fuel-air mixture at ambient pressure, when utilizing low pressure gas supply. Such an apparatus can be advantageously employed in a ramjet powered engine power plant to cost effectively generate mechanical and electrical power.

Another important object of my invention is to provide a method for the design of fuel-air mixing devices which can effectively achieve uniform fuel-air concentrations in a mixed gas stream, when faced with an inlet air stream from a fan operating at or near ambient pressure, and from a low pressure gas supply.

Other important but more specific objects of the invention reside in the provision of ramjet engine based power generation plants which:

have highly efficient fuel air mixing sections that reliably supply uniform, lean fuel-air mixtures for combustion in the ramjet engine; cleanly burns fossil fuels;

in conjunction with the preceding object, provide low emission rates of nitrogen oxides (NOx);

in conjunction with the just mentioned object, results in fewer negative environmental impacts than most power generation facilities presently in use;

allow the generation of power to be done with low pressure and other hard to handle feedstocks; avoid parasitic power consumption for compression of fuel;

require less peripheral support equipment than many existing technology gas turbine power plants;

are easy to construct, to start, to operate, and to service;

One key feature of the present invention is achievement of a low ratio of the root mean square peak fuel concentration to the average fuel concentration in the final fuel-air supply mixture sent to the combustor.

Still another important feature of the present invention is the use of vortex generators of preselected size to generate sufficient vorticity to effect the desired degree of mixing. This design feature assures that the final fuel-air mixture is uniformly and thoroughly mixed, and that only the amount of inlet air and fuel necessary for combustion in the ramjets is provided.

Another important feature of the present invention is the ability to accept low grade fuels, such as (a) methane from gathered gas at coal mines or coal seams, or (b) gas from landfill off-gas gathering systems, or (c) flare gas from oil and/or gas production, transmission, and refining facilities, due to the ability of the ramjet engine to accept a fuel-air mixture at or near ambient pressure, including, those gases which may be found within combustible mixture ratios.

Still another important feature of the present invention is the ability of the ramjet engine to accept a variety of fuel gases, including the above mentioned methane, as well as ethane, propane, pentane, butane, and certain less commonly encountered gases, including hydrogen, propylene, and acetylene.

Finally, another important feature of my novel fuel-air mixing housing is the unique combination of an axial flow inlet air fan with converging ambient pressure fuel-air mixing chamber and a transversely mounted high speed ramjet engine.

Other important objects, features, and additional advantages of my invention will become apparent to those skilled in the art from the foregoing and from the detailed description which follows and the appended claims, in conjunction with the accompanying drawing.

DETAILED DESCRIPTION

Figure 1:
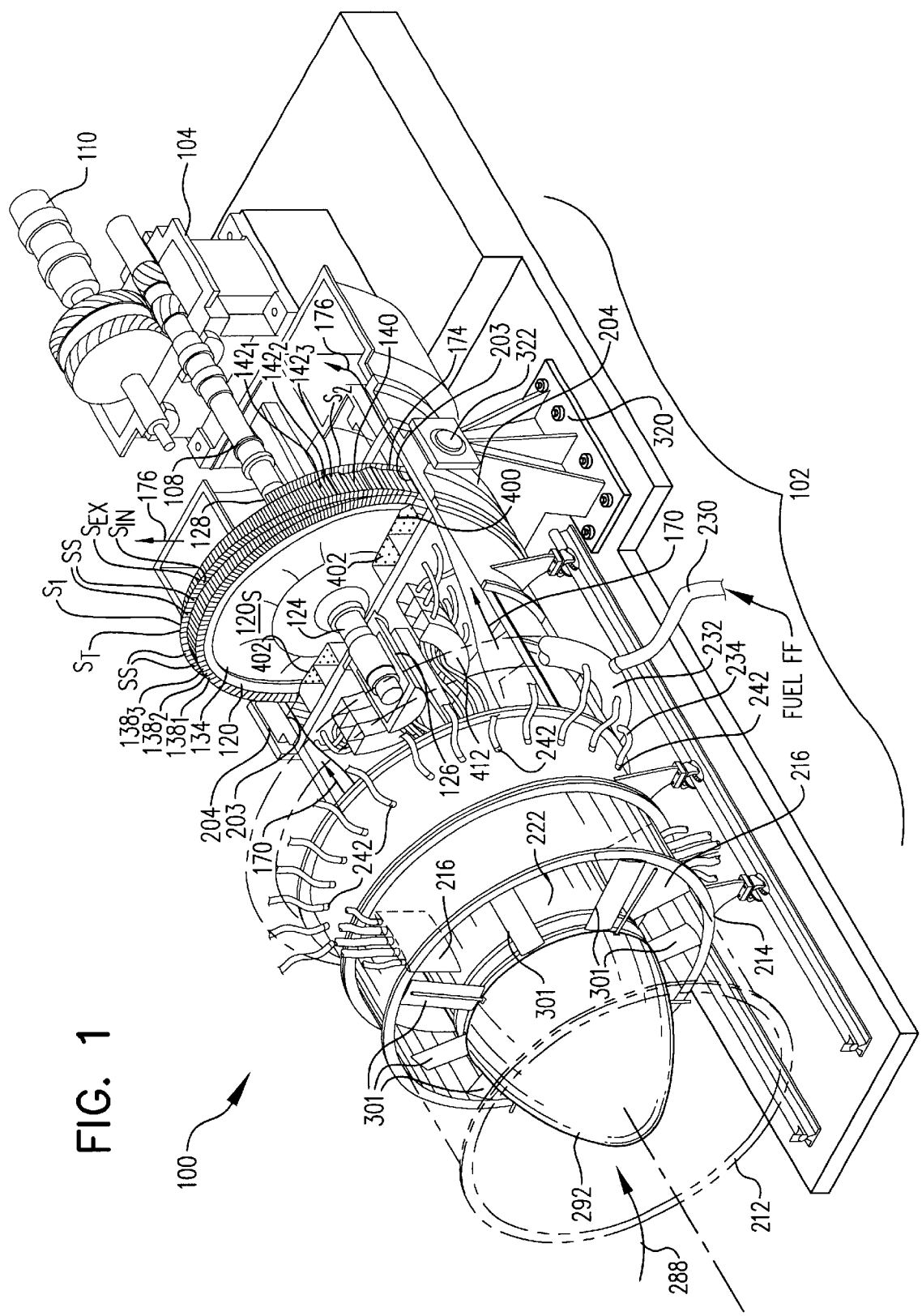
FIG. 1 provides a partial perspective view of my novel power plant apparatus, showing the inlet nacelle, the axial inlet air fan, the fuel header and inlet fuel feed lines which feed fuel at low pressure to stators for injection at fuel outlets opposite vortex generators (shown in other figures), and showing the converging annular inlet gas flow path to accelerate the mixed inlet gas to the rotary ramjet, which rotates within a low aerodynamic drag housing and which compresses the mixed inlet gas against a peripheral wall, to oxidize the fuel and to create hot combustion gases, thereby driving the rotary ramjet and output shaft which is coupled with a gear box for useful mechanical output work.

Referring now to the drawing, FIG. 1 depicts a partial cut-away perspective view of my novel rotary ramjet driven power plant 100. Major components shown in this FIG. 1 include the rotary ramjet engine assembly 102 and gear set 104. The ramjet engine assembly 102 has a driven output shaft 108, which is operationally coupled with gear set 104 for power transfer therethrough. Gear set 104 has power output shaft 110, which is coupled with and rotates at a desired rate of rotation to drive an electrical generator (not shown), or other shaft power consumer.

The structure of the rotary ramjet engine assembly 102 has several key components. A high strength rotor 120$_s$ has output shaft portions 124 and 108. The output shaft portions 108 and 124 turn in inlet 126 and outlet (barely visible) 128 bearing assemblies, respectively. In FIG. 1, one embodiment of my high strength rotor 120 design and components thereof is shown, illustrating rotor construction using central disc 134 (of ultra-high strength steel, or high strength fiber composite, or metal matrix composite).

A plurality of rim segments 138 in a series of rim segments from 138$_1$ through 138$_x$ are interlockingly and detachably secured to the central disc 134. One or more, and preferably two or more ramjets 140 are provided using detachably affixable ramjet thrust segments 142 in a series of thrust segments 142$_1$ through 142$_x$ affixed to central disc 134. Each of the required ramjet thrust segments are provided in functional order, shaped as required in a then relevant portion of the applicable ramjet structure, the basics of which are taught in my earlier and now issued U.S. Pat. No. 5,372,005, and particularly, U.S. Pat. No. 5,709,076, as well as U.S. patent application Ser. No. 08/213,217 (filed Mar. 3, 1994); for details see the full disclosures of each, which are incorporated herein in their entirety by this reference.

Importantly, there are also a number of peripherially extending and preferably helical strakes $S_1$ through $S_N$. Each of strakes $S_1$ through $S_N$ has a number of strake segments SS of radial height $S_H$, each strake segment SS being integrally provided with a rim segment 138, or with a ramjet thrust segment portion 142, as appropriate. The strakes $S_1$ through $S_N$ partition the well mixed fuel-air inlet gas 170 (which preferably is thoroughly and uniformly mixed as further explained herein below to provide both fuel and oxidizer), so that the mixed inlet gas 170 flows to the ramjet inlet throat 174. This process occurs at a first of one or more ramjets 140 and then at a second (not shown) of one or more ramjets 140 and so on to an Xth of the one or more ramjets 140 that are mounted on rotor 120. Preferably, the number X of ramjets 140 and the number N of strakes S are the same positive integer number, and N and X are at least equal to two.

The strakes $S_1$ through $S_N$ allow the feed of a well mixed fuel-air inlet gas 170 to each ramjet 140 without appreciable bypass of the entering mixed inlet gas 170 to the exhaust combustion gases 176. Also, the exhaust combustion gases 176 exiting from each of the one or more ramjets 140 is effectively prevented by the arrangement of strakes S from interfering with the inflow of fuel air premix, thus effectively preventing the return of spent combustion gases 176 from the exhaust side $S_{EX}$ of strakes S to the inlet side $S_{IN}$ of strakes S.

The construction and operation of my ramjet 140 is quite unique. The ramjet thrust segments 142, as seen in FIG. 1, are provided in an unshrouded configuration, that is, the ramjet structure affixed as part of rotor 120 provides the necessary elements for compression of incoming mixed inlet gas 170, except for a containment structure against which compression of the mixed inlet gas 170 and expansion of escaping hot combustion gas 176 occurs. In this unique engine, the necessary containment structure for compression of the incoming fuel-air mixture is provided by the inner peripheral wall 203 of engine housing 204. The above discussed strakes S have a radial height $S_H$ (see FIG. 5) which extends to a tip end $S_T$ that is designed for rotation very near to the interior peripheral wall surface 203, in order to minimize gas leakage in either direction.

Figure 4:
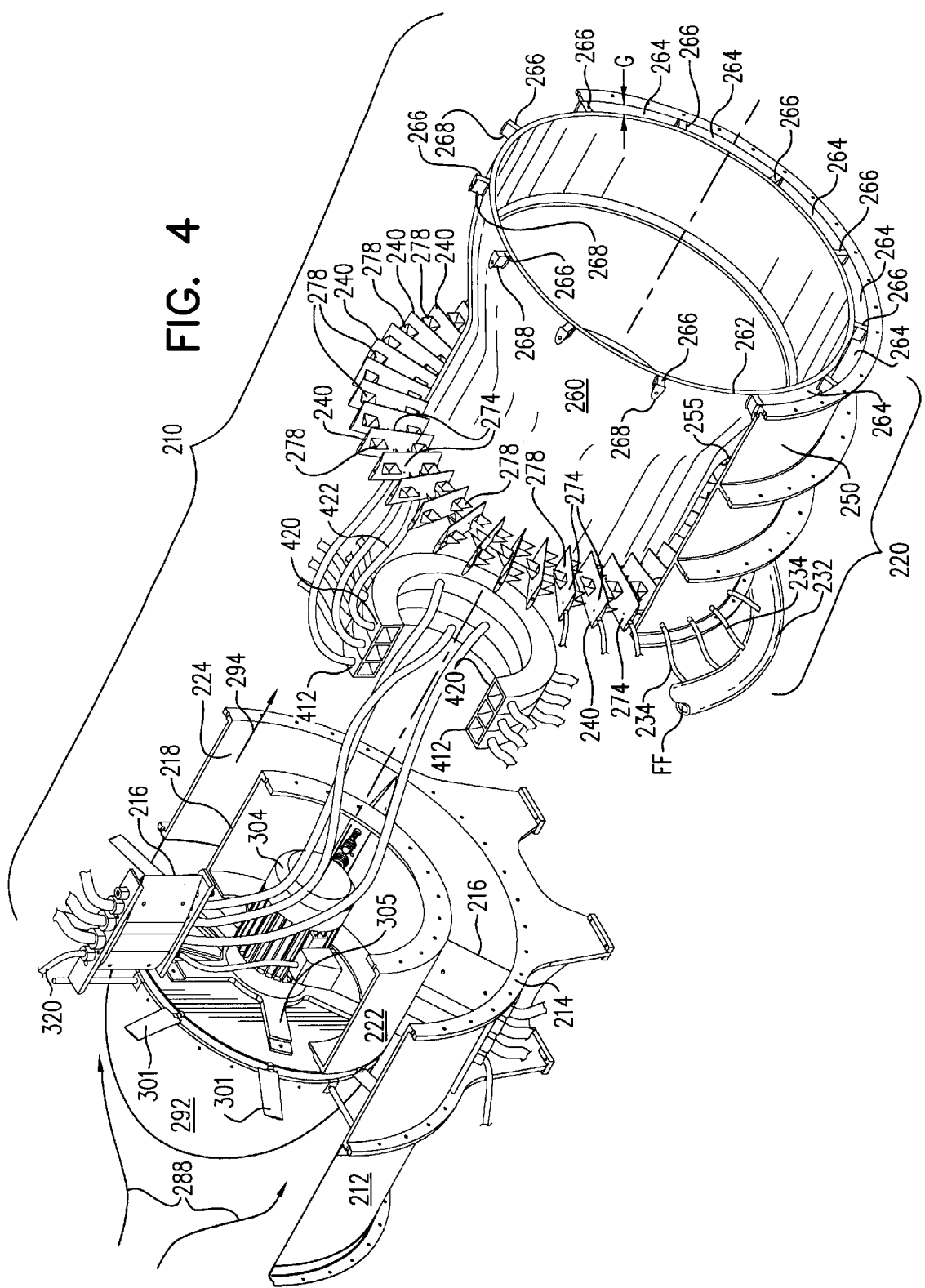
FIG. 4 is a partially, split, partially exposed perspective view of my ramjet power plant apparatus, showing in a first part the annular air supply plenum and accompanying axial inlet air fan, and in a second part the fuel-air premix housing with airfoil shaped stators which are fixed between inner and outer stationary housing walls, and the vortex generators for adding transverse momentum to the entering air to assure adequate mixing of fuel and air to produce a uniformly mixed inlet gas for supply to the rotary ramjet.
Figure 5:
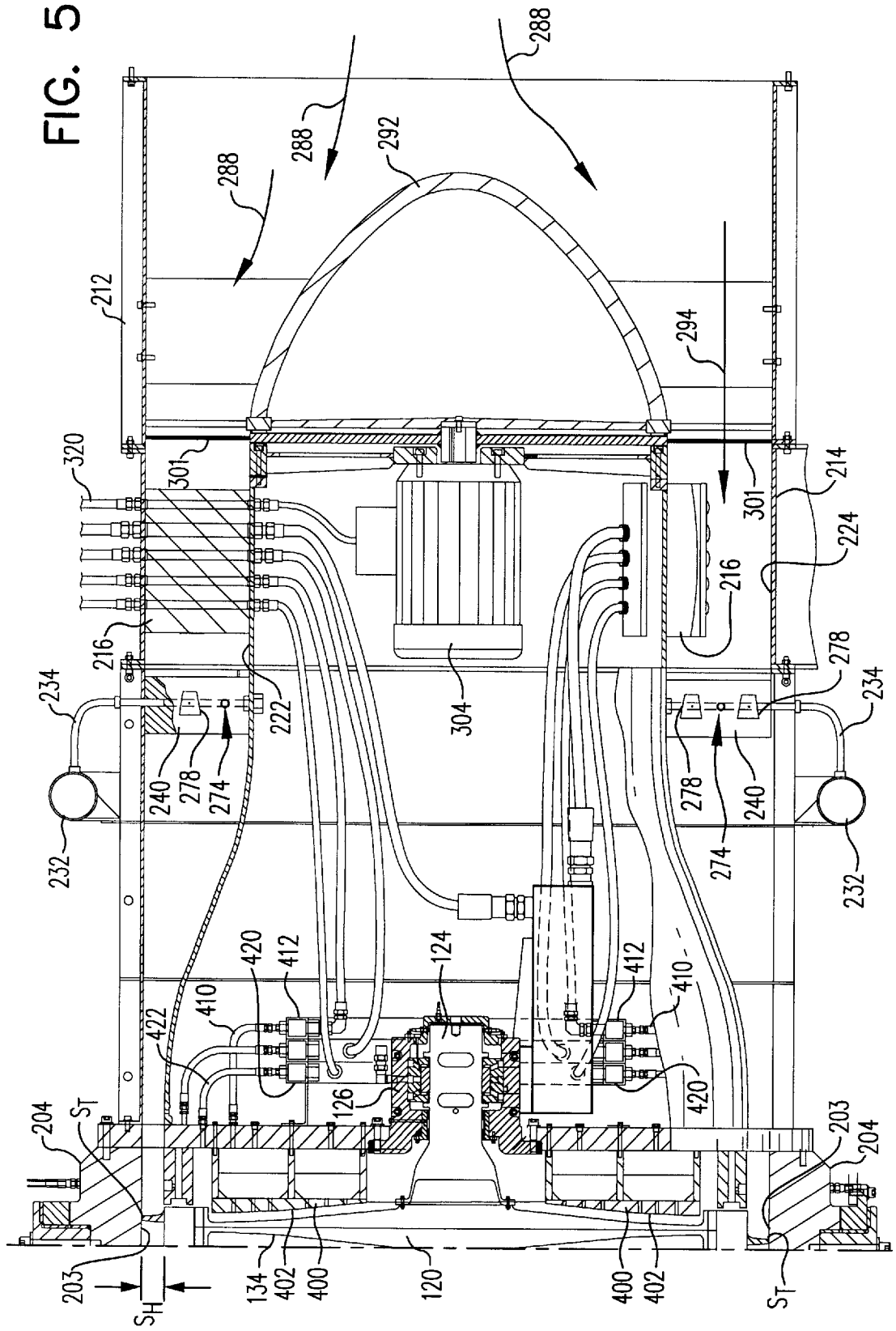
FIG. 5 is a cross-sectional view of the inlet to my ramjet power plant, showing the inlet nacelle, the axial inlet fan, air supply plenum, the fuel-air premix housing with airfoil shaped stators which are fixed between inner and outer stationary housing walls, and the converging annular space for feed of the mixed inlet gas to the ramjets at the periphery of the rotor.

Turning now to FIGS. 4 and 5, the detailed structure of the overall fuel-air pre-mixing housing 210 and related components of my novel rotary ramjet power plant 100 are illustrated. Major components include an inlet plenum 212, a support casing 214 with utility struts 216 that support fan housing 218, and the mixing section 220. The preferably smooth outer surface 222 of the fan housing 218, and the inner surface 224 of the support casing 214 provide an initial length $X_F$ for receiving the inlet airflow.

Figure 2:
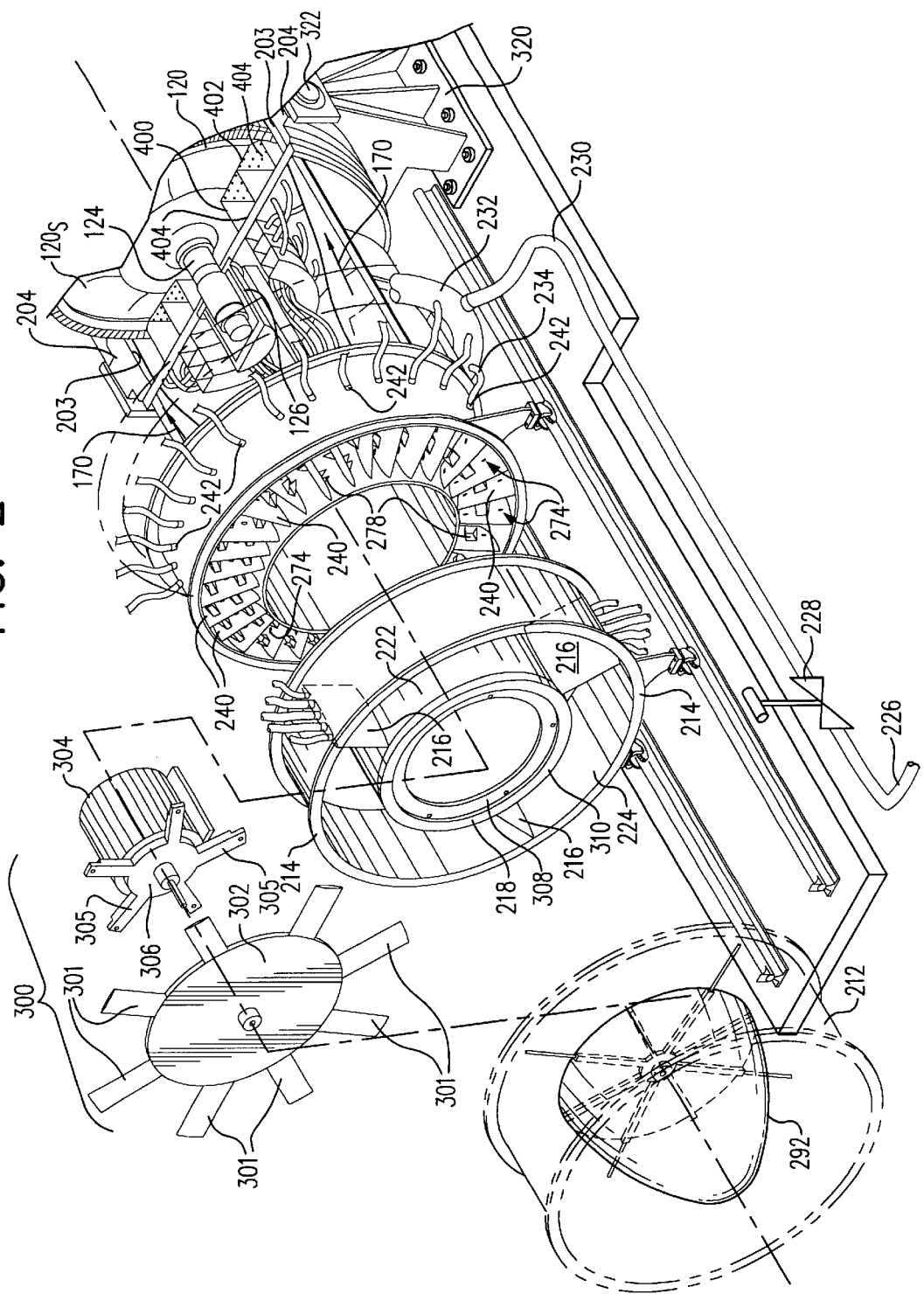
FIG. 2 is a partial perspective view of my novel power plant apparatus, similar to the view just shown in FIG. 1 above, but now showing the axial inlet air fan and accompanying fan motor in more detail, and now showing the fuel-air pre-mix housing having a series of radially disposed airfoil shaped stators and accompanying vortex generators for adding transverse momentum to the entering air to assure adequate mixing of fuel and air to produce a uniformly mixed inlet gas for supply to the rotary ramjet.

As noted in FIG. 2, a fuel FF such as natural gas is supplied, through a main fuel header 226 and a pressure regulator 228, thence to fuel supply line 230 and then on to one or more fuel supply headers or manifolds 232. Fuel distribution lines 234 (in a series of distribution lines 234$_1$ through 234$_x$, where "x" associated with distribution lines "234" corresponds to the number of fuel supply structures 240 (stators), to provide fuel from headers 232 to the fuel supply structures 240, via fuel inlet fittings 242 (see FIG. 7).

Figure 3:
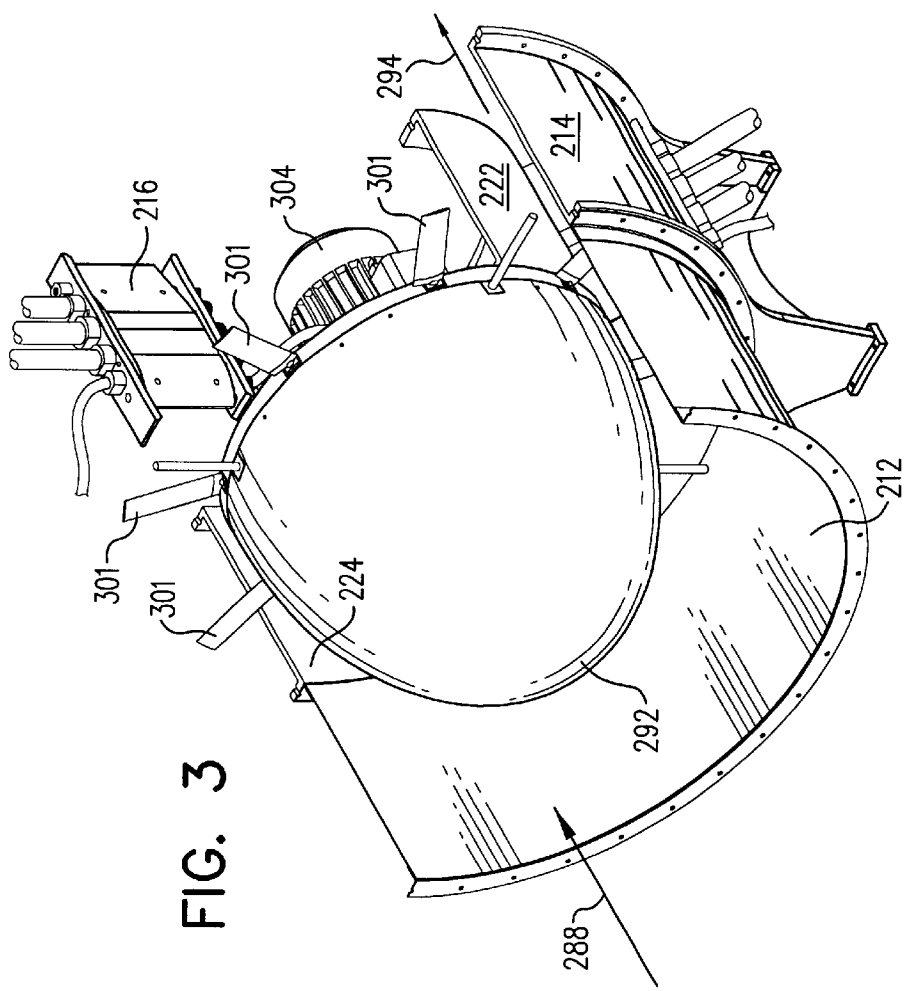
FIG. 3 is a split, partially exposed perspective view of the inlet, showing the inlet nacelle, the axial inlet air fan, struts used for the connection of a portion of the electrical power, water, oil, compressed air, and vacuum lines to the engine, and importantly showing an annular air supply plenum immediately upstream of the fuel-air pre-mix housing.
Figure 7:
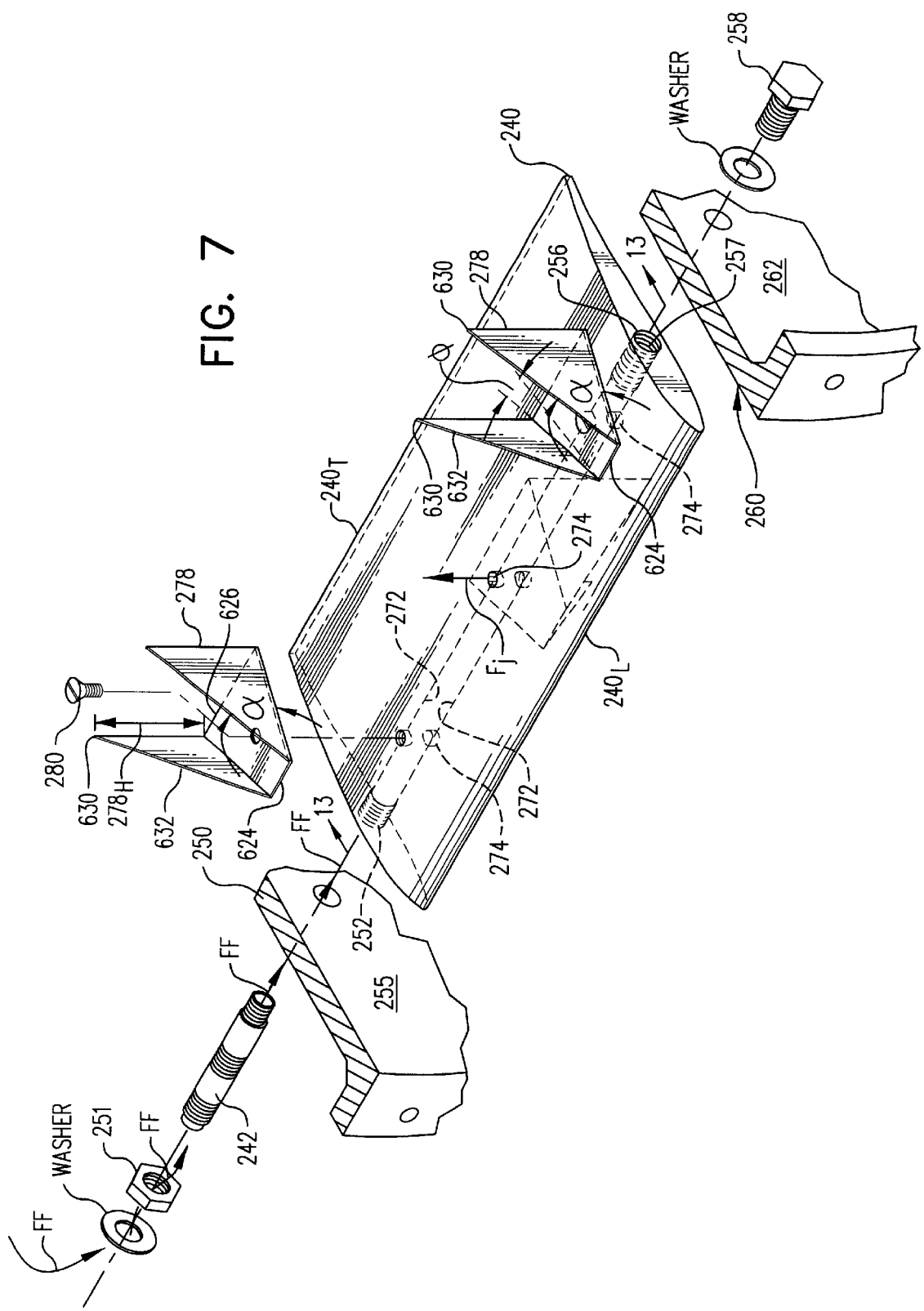
FIG. 7 is a partially exploded perspective view of a stator, showing the centrally located fuel passageway, fuel injection outlets for injecting fuel into the passing airstream, hollow fittings located radially outwardly for secure fluid connection to the fuel inlet, vortex generators for assuring adequate mixing of fuel and air, and inner and outer walls, between which the stator is mounted.

As more clearly illustrated in the perspective view provided in FIG. 7, fuel inlet fittings 242 are preferably provided in size and shape to extend through outer wall 250 of mixing section 220, to secure (with fasteners such as nuts 251) the radially distal fuel inlet 252 of fuel supply structures 240. This is preferably accomplished with distal inlet threads 254 (see FIG. 8) of the radially distal inlet 252. The fuel inlet fittings 242 can also be utilized to secure the radially distal or outer end 240$_O$ of fuel supply structures 240 to the inner surface 255 of outer wall 250. In this configuration, a radially proximal inlet 256 with proximal inlet threads 257 is plugged with gas tight fastener 258, which also serves to secure the radially proximal or inner end 240$_I$ of fuel supply structures 240 to the outer surface 260 of inner wall 262 of the convergent, preferably annular inlet air plenum 264. As further seen in FIG. 3, spacers 266 with smooth airfoil leading edges 268 are provided at a narrow cross-section of inlet air plenum 264 to securely space apart the inner wall 262 and outer wall 250 via a gap distance G.

Fuel supply structure 240 preferably has a low drag aerodynamic body shape with a leading edge 240$_L$, a trailing edge 240$_T$, a chord C and a thickness T. A fuel passageway 270 defined by interior wall 272 extends between distal inlet 252 and the proximal inlet 256 of fuel supply structure 240. For ease of fabrication, I prefer to provide fuel injection outlets 274 defined by injector edge wall 275 in opposition to fastener receiving threads 276 which are used to secure one or more vortex generators 278 to stator 240 via fasteners such as threaded machine screws 280.

As noted above, ramjets 140 are suitable for oxidizing a fuel FF continuously supplied thereto, preferably in a thoroughly mixed inlet gas stream 170. Referring now to FIG. 4, and to FIG. 1, it can be seen that in order to accomplish the required thorough mixing, the entering airstream 288 is preferably provided through inlet plenum 212, where the preferably stationary inlet nacelle 292 before axial fan 300 partitions the inlet carrier gas stream 288 (normally air, although mixed gas containing preselected additives could be provided) into an annular air supply stream 294. The aerodynamically efficient blades 301 of axial fan 300 are attached to fan hub 302 which is driven by fan motor 304. Fan motor 304 is supported by preferably spoked 305 type mounting bracket 306 detachably mounted from a recessed fan mounting flange 308 at the upstream end 310 of support casing 214. The fan is preferably supplied by electrical power via cable 320, through utility strut 216.

Figure 9:
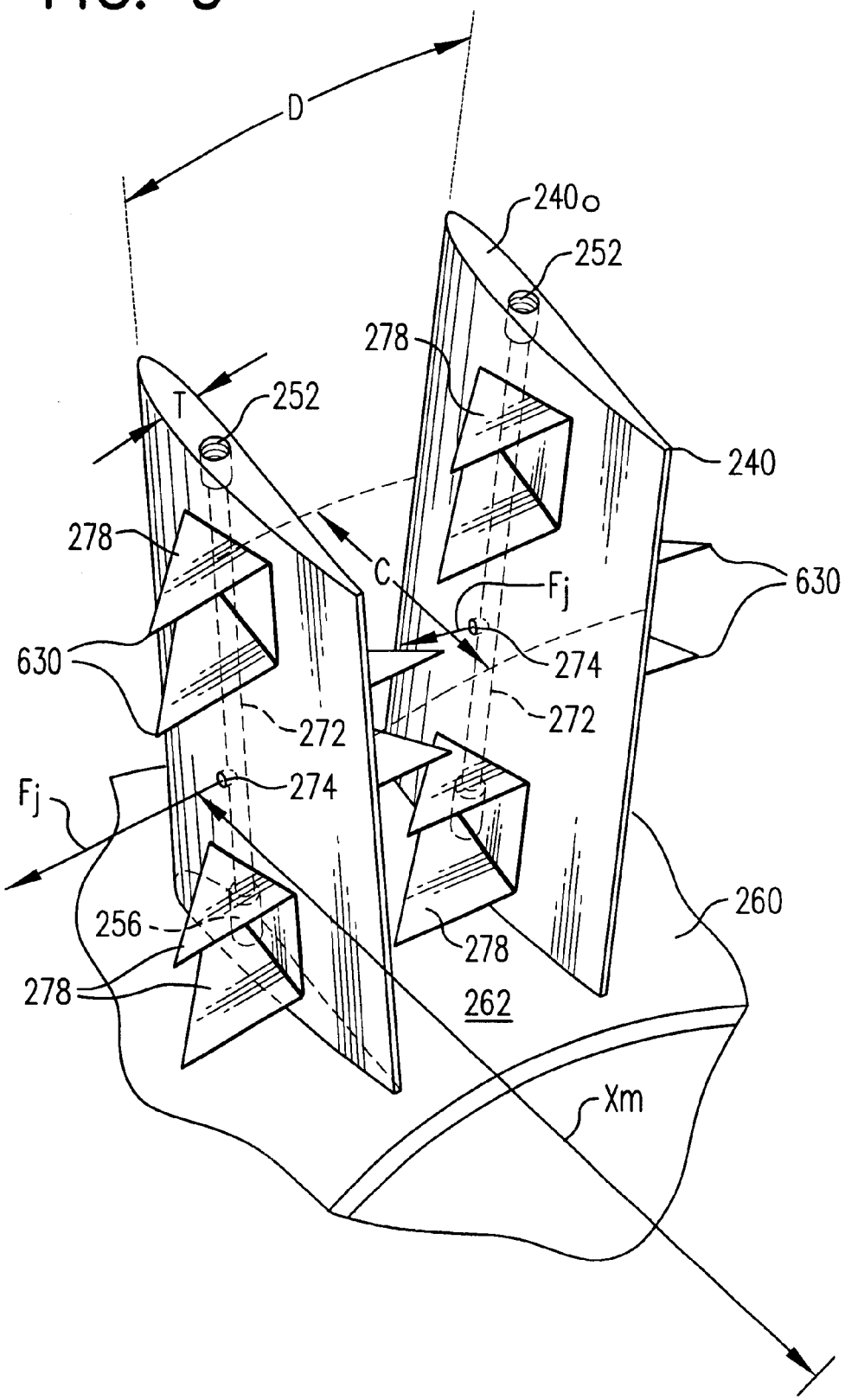
FIG. 9 provides a perspective view of a pair of adjacent stators, and indicates key parameters which are utilized in the method taught herein to achieve uniform lean pre-mix conditions of the low pressure mixed inlet gas.

The annular flow of the inlet air stream 294 is straightened and smoothed by the leading edge portion $240_L$ of the fuel supply structures 240. However, fuel is injected at fuel injection outlets 274, and transverse momentum is imparted to some of the inlet air stream 294 as well as to the relatively low velocity injected fuel by vortex generators 278. The vortex generators are located sufficiently upstream of the ramjets U so as to allow thorough and reliable fuel-air mixing through a mixing length $X_M$, as indicated in FIG. 9. A resultant thoroughly mixed inlet gas stream 170 is fed to ramjets 140, which utilize oxygen (preferably from the incoming airstream 288, or otherwise supplied or supplemented) as the oxidant source. Ramjets 140 are provided at the outer, distal reaches of rotor 120 so that the propulsive effect of the ramjets 140 is utilized to turn rotor 120 and the output shaft 108.

The rotor 120 is rotatably secured in an operating position by a fixed support structure base 320 at pivot pin 322 in a manner suitable for extremely high speed operation, such as rotation rates in the range from as low as about 4,500 rpm, or more preferably from about 6000 to 7000 rpm, or up to about 8,900 rpm, or even 10,000 to 20,000 rpm, or higher. In this regard, inlet side bearing assembly 126 and outlet side bearing assembly 128, or suitable variations thereof, must provide adequate bearing support for high speed rotation and thrust, with minimum friction. The detailed bearing and lubrication systems may be provided by any convenient means, and although oil supply and return lines are shown in FIG. 5 of the drawing, need not be further discussed herein.

As earlier indicated, a key feature of my power plant is the rotor 120. Rotor 120 spins about its axis of rotation due to thrust from ramjets 140. Two design parameters of the rotor 120 are extremely important. First, the rotor must be constructed of materials which enable it to survive the extremely high centrifugal loads encountered while the rotor is moving so that the ramjet can operate at supersonic speeds, preferably in the Mach 3.5 range, i.e., the rotor must be capable of withstanding extremely high tensile stress. Second, at such speeds, minimizing the rotor's overall aerodynamic drag is critical.

I prefer use of a boundary layer control technique to reduce aerodynamic drag on the rotor 120. One suitable method is to provide a tight fitting housing 400 with rotor side surface 402 in close proximity to surface $120_s$ of rotor 120. More preferably, providing and sealing an operating cavity 404, behind the tight fitting housing 400, so as to enable the rotor to function as a vacuum pump, which allows most gas on the surface $120_s$ of the rotor to be suctioned off via vacuum line 410 from hoop shaped vacuum header 412. Also, cooling air for the rim segments 138 and thrust segments 142 is provided via hoop shaped compressed air header 420 and air line 422.

Finally, even though high combustion temperatures are experienced, my advanced fuel-air mixing apparatus provides extremely low NOX output. This is because of the lean and extremely well mixed fuel-air inlet gas stream, and because of the short residence times at the high combustion temperatures. Thus, nitrogen dioxide emissions are limited by limiting the size of highly non-equilibrium free-radical zones in the combustor.

Figure 10:
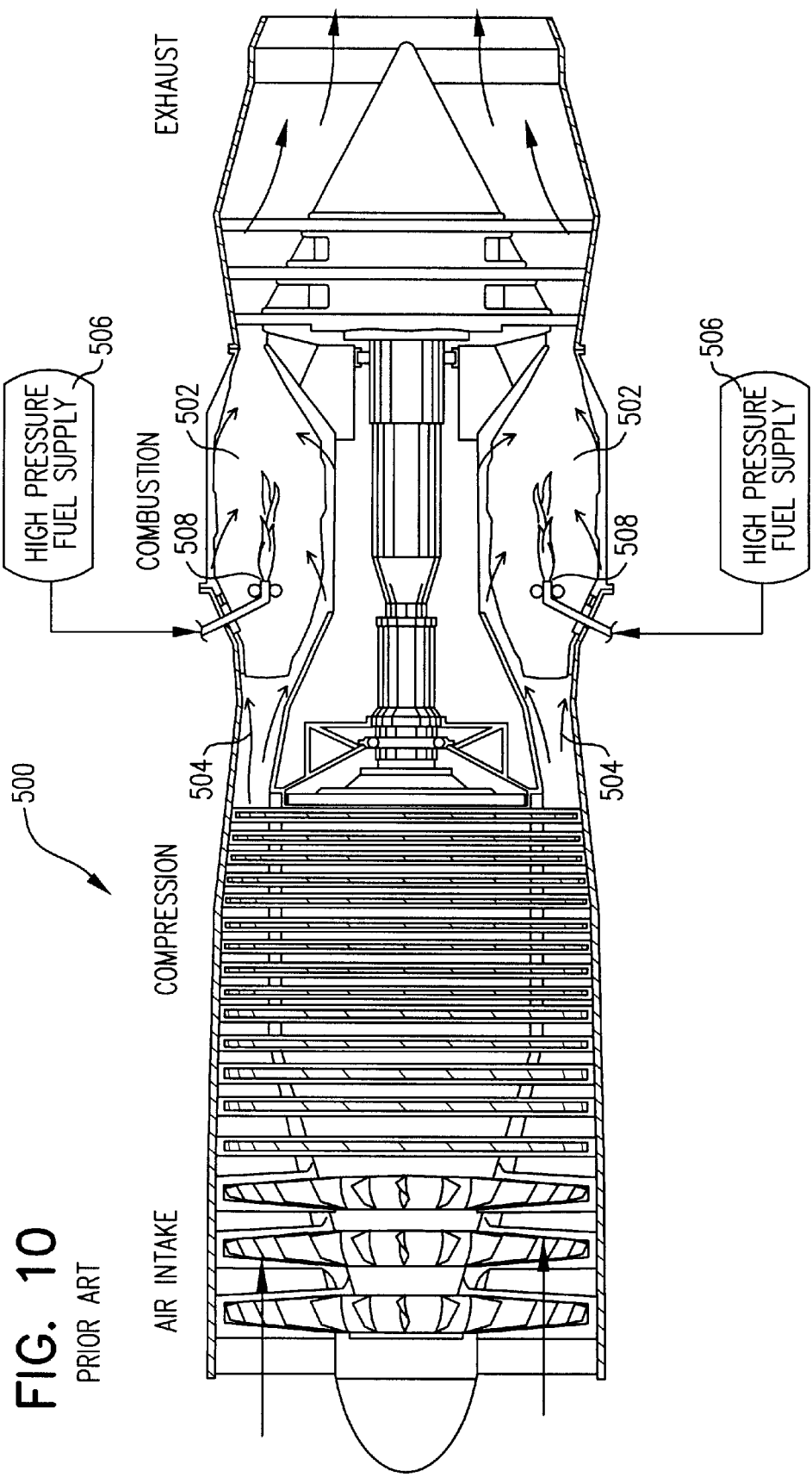
FIG. 10 shows one type of prior art gas turbine engine, indicating how compression occurs prior to fuel injection, undesirably resulting in the need for injection of inlet fuel under relatively high pressures.

The method by which such efficient and advantageous fuel-air mixing is achieved is important to understand. In prior art gas turbine engines 500, such as described the example set forth in FIG. 10, because the combustor 502 is operated by burning the compressed inlet air stream 504, the fuel 506 is injected at fuel nozzles 508 at relatively high pressure, for example, at 200 pounds per square inch, or more. In the case where stationary gas turbine engines are used for power generation, this results in the necessity to provide gas compression equipment when burning natural gas, which is a commonly preferred fuel. Consequently, an immediate efficiency penalty is experienced at such prior art plants due to the parasitic loss inherent in providing for compression of the fuel. Alternately, or in some cases additionally, a cost penalty is experienced at such prior art plants due to the necessity to locate such gas turbine facilities near and to be serviced by a high pressure gas line.

In contrast to such prior art gas turbine equipment, my ramjet power plant 102 can utilize low pressure fuel injection. This can be achieved because I have discovered a method for reliably assuring that a low pressure gas supply, such as might be injected into an air stream for mixing at as low as about 2 psig, is thoroughly mixed with a carrier gas supply stream containing an oxidant. In most cases, the preferred carrier gas supply stream is air, available without supply cost, although some treatment maybe necessary and/or desirable. Importantly, fuel and air can be mixed at ambient pressure and temperature in my ramjet power plant design.

Turbulent mixing in two-dimensional ducts with transverse jets has been studied, and the mixing behavior with respect to the concentration of an injectant such as fuel in a bulk inlet carrier gas such as air has been evaluated in a paper by Breidenthal et al, AIAA Paper 85-1600, copyright 1986 by the American Institute of Aeronautics and Astronautics. Basically, Breidenthal et al found that for both tubular and rectangular mixing ducts over a variety of conditions, the variation of rms amplitude of the concentration fluctuations c' of an injectant, divided by the mean concentration c of an injectant, can be described by the following equation:

$$c'/c = 0.34 \, D/Jx$$

where

D is a characteristic duct or mixing-cell height, x is downstream distance from the injector nozzle exit, J is the momentum ratio of the transverse jets to the longitudinal flow.

Figure 6:
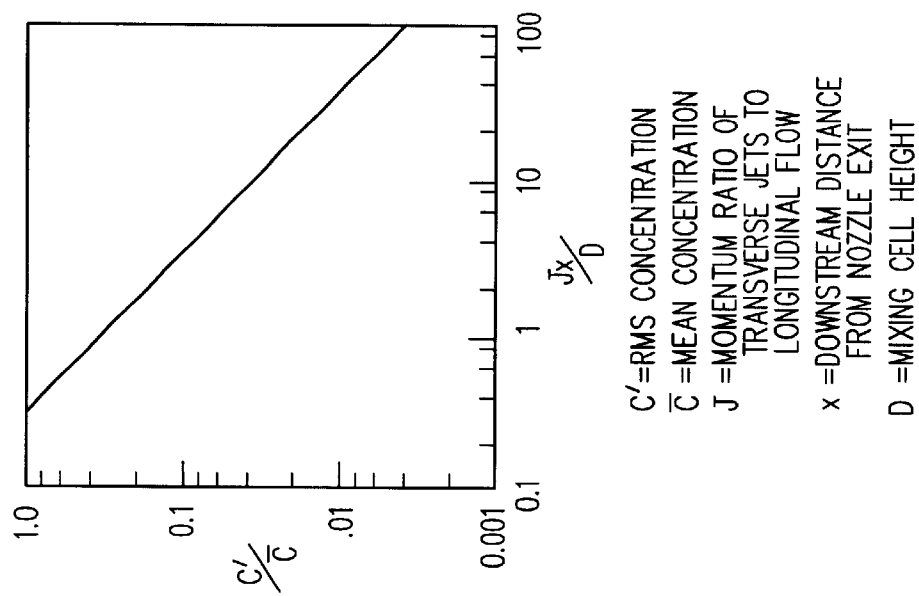
FIG. 6 is a graphical depiction of desirable gas mixing characteristics, as known in the prior art, provided to assist the reader in understanding one of the desirable design objectives useful in achieving a proper ratio of transverse momentum to axial momentum in order to achieve the desired high degree of uniformity of fuel concentration in a well mixed inlet gas.

The above relationship, as taught in the prior art has been set forth in FIG. 6. As taught by Breidenthal et al, in order to achieve a relatively low ratio of c'/c, i.e., to achieve good "mixedness", it is necessary to increase the mixing cell length x (shown as mixing cell length $X_M$ in FIG. 9), and/or increase the momentum ratio J. The latter is accomplished by increasing the momentum of the transverse jet, or in other words, by utilizing a high velocity jet to introduce the fuel into the mixing zone. This is because, as taught in the prior art, the momentum ratio J is further described as follows:

$$J = \frac{(p_j)(V_j^2)(A_j)}{(p_c)(V_c^2)(A_c)}$$

where $p_j$=the density of the injected fuel, $V_j$=the velocity of the injected fuel, $A_j$=the area of the transverse jet, and $p_c$=the density of the axial carrier gas stream, $V_c$=the velocity of the axial carrier gas stream,
$A_c$=the cross-sectional area of the axial carrier gas stream.

In my design, a potentially serious limitation is encountered when one initially attempts to take advantage of the fact that my ramjet engine does not require high pressure fuel to be fed to the combustor. This is because in the absence of the availability of such high pressure fuel, the desirable low ratio of c'/c, which assures that the fuel-air mixture is uniformly and thoroughly mixed, cannot be achieved by the use of a "high momentum jet" of injected fuel. However, such a limitation can be overcome by the creation of transverse momentum via another method, rather than with a high momentum jet.

In my engine, the thorough mixing of fuel with the inlet carrier gas is achieved by imparting the necessary transverse momentum through the use of vortex generators. More specifically, vortex generators are provided so that a portion of the axial momentum of the carrier gas is converted to transverse momentum. In other words, in a theoretical limit analysis, assuming that the momentum of the injected fuel gas is zero, sufficient transverse momentum is created in the carrier gas by the vortex generators to provide a momentum ratio $J_0$, where $$J_0 = \frac{\Sigma(p_g)(V_g^2)(A_g)}{(p_c)(V_c^2)(A_c)}$$

where $p_g$=density of the carrier gas moving transversely
$V_g$=velocity of carrier gas moving transversely
$A_g$=cross-sectional area of the carrier gas moving transversely.

Because each vortex generator 278 creates a transverse lift component, and thus a transverse force component, such force component is analogous to the transverse momentum which would be effected by utilizing a transverse jet. Consequently, it is possible to express the momentum ratio between the vortex generators and the axially flowing carrier gas, for any cell analyzed, as follows:

$$J_0 = \frac{L}{(p_c)(V_c^2)(A_{cn})}$$

Since L=½ ($p_c$) ($V^2_c$) ($C_L$) (S), then substituting for L, $$J_0 = \frac{1/2(p_c)(V_c^2)(C_L)(S)}{(p_c)(V_c^2)(A_{cn})}$$

Where:

L=lift created by the vortex generator
CL=coefficient of lift of the vortex generator
S=planform area of the vortex generator So, after reduction of the equation, $$J_0 = \frac{(C_L)(S)}{2(A_{cn})}$$

In other words, an effective momentum ratio $J_0$ has just been described with respect to the effective momentum provided by the vortex generators, based on the coefficient of lift and planeform area of the vortex generator, assuming no momentum contribution from a transverse injection jet.

Actually, since even low pressure fuel injection will result in fuel jets $F_j$ that carry at least some useful quantum of momentum, especially at higher fuel flow rates necessary at full load operation, the effective momentum ratio, $J_{eff}$ in my ramjet engine design will be the sum of the transverse momentum contributed by (i) the injected fuel and (ii) the transverse momentum provided by the vortex generators, divided by the net axial momentum provided by the remaining carrier gas stream, i.e., that substantial portion of the inlet carrier gas (usually, an entering air stream) which maintains its momentum along the longitudinal axis.

$$J_{eff} = \frac{[(p_j)(V_j^2)(A_j)] + [1/2(p_g)(V_{cn}^2)(C_L)(S)]}{(p_{cn})(V_{cn}^2)(A_{cn})}$$

$p_{cn}$ = density of net axial carrier gas stream, $V_{cn}$ = the velocity net axial carrier gas stream, $A_{cn}$ = the area of net axial carrier gas stream.

Figure 8:
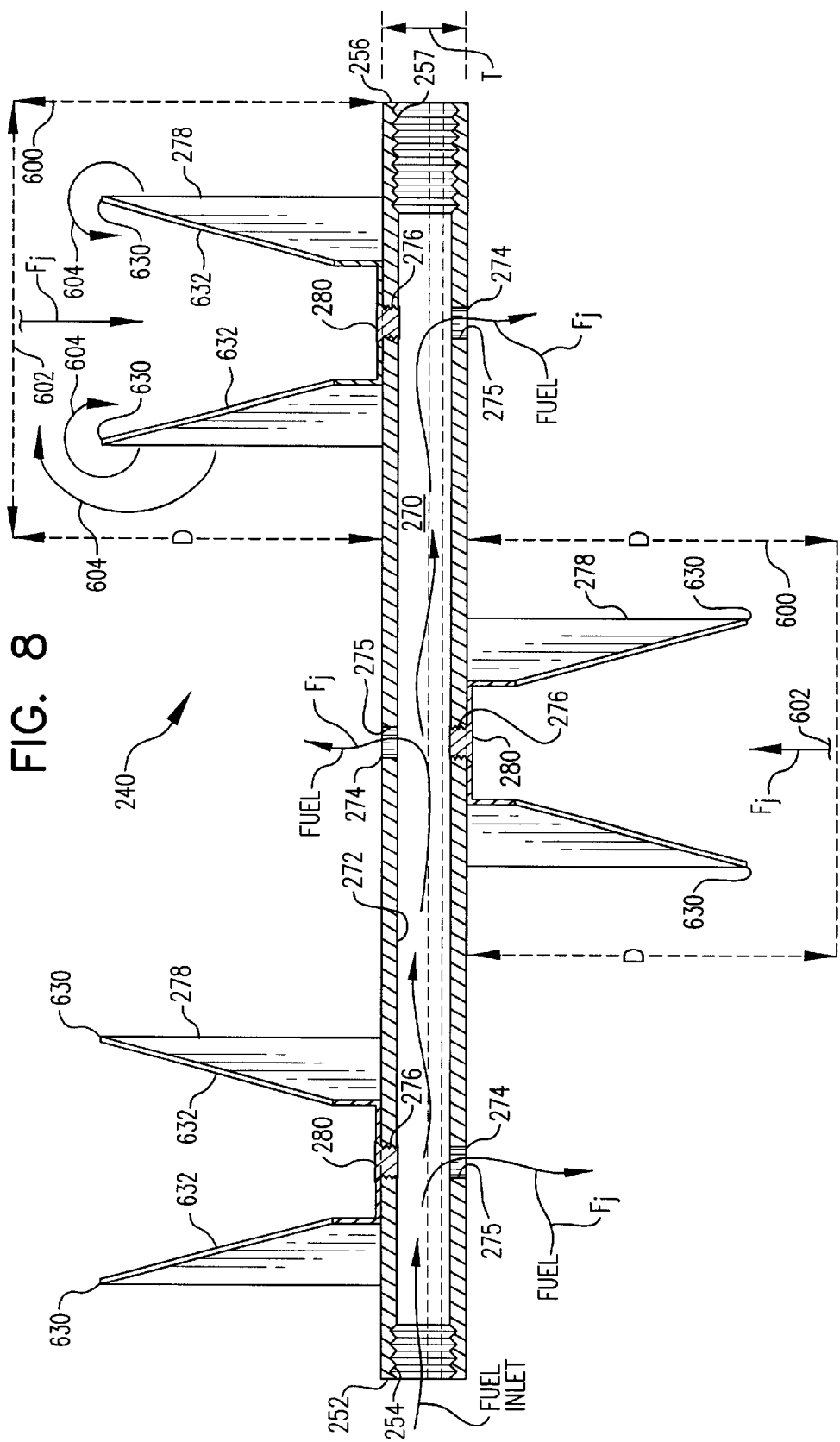
FIG. 8 is a radial cross-sectional view of a stator, showing a centrally located fuel passageway, fuel injection outlets, and three vortex generators designed for mixing fuel with air to produce a mixed inlet gas for supply to the rotary ramjet.

Details of this unique design can be further understood with reference to FIGS. 8 and 9. For design and analytical purposes, a plurality of mixing cells 600 are utilized. A characteristic mixing cell height D is selected. As shown in FIG. 9, the mixing cell height D is the distance between adjacent fuel supply structures The transverse or spanwise dimension 602 of the mixing cell is unimportant with respect to actual dimensions, so long as the vortices 604 created by vortex generators 278 have the ability to fill the mixing cell 600, spanwise, since the ratio of the rms peak concentration c' to the average concentration c is independent of the transverse location that is filled by the created vortices 604.

In one embodiment, I prefer to utilize a cell height D of about 5 inches, and a mixing length $X_M$ of about two feet or more; however, such dimensions are adjustable based on the inlet carrier gas velocity and the geometry of the vortex generators 278.

With respect to vortex generator geometry, I have found it advantageous to provide such generators in paired units $278_A$ and $278_B$ that formed with and mounted on an integral, one-piece, common base 620. More preferably, the paired units $278_A$ and $278_B$ are mirror image sets. In such cases, it is often advantageous to provide a trapezoidal base 622, with a nose 624 and a wider trailing edge 626, where the vortex generator $278_A$ or $278_B$ is offset by an angle theta (θ). An angle alpha (α) is provided from the trailing edge 626 to nose 624 to tip 630, to provide a swept back leading edge 632. The exact dimensions and angles may vary so long as the appropriate ratios are provided to assure uniform mixing results.

One important advantage which is afforded by my fuel-air mixing apparatus and method is that low pressure fuel can be utilized, particularly fuels of less than 60 psig, and more preferably less than about 30 psig, and even more preferably, of about 15 psig or less. A related advantage is that low pressure gas gathered from hydrocarbon production can be utilized. For example, gas now normally flared in offshore oil platforms, or from gas gathering fields, or gas transmission facilities, or from refinery operations, can be advantageously utilized, without the necessity to compress such gas (which operation cannot be conducted safely, with respect to some types of fuels which may be alternately and advantageously consumed in my equipment).

Thus, it can be seen that the method and apparatus for producing mechanical, electrical, and thermal power as described above provides a revolutionary, compact, easily constructed, cost effective power plant. The output from this power plant can be used in conjunction with existing power delivery systems, and represents a significant option for reducing air emissions by combustion of clean burning fuels. Further, given the efficiencies, dramatically less fuel will be consumed per unit of electrical, mechanical, or thermal energy generated.

Consequently, it will be seen that the objects set forth above, including those made apparent from the proceeding description, are efficiently attained, and, since certain changes may be made in carrying out the construction of a power generation apparatus and in the execution of the method of power generation described herein, while nevertheless achieving desirable results in accord with the principles generally set forth herein, it is to be understood that the invention may be embodied in other specific forms without departing from the spirit or essential characteristics thereof. For example, while I have set forth exemplary designs for a fuel feed arrangement, many other embodiments are also feasible to attain the result of the principles of the apparatus and via use of the methods disclosed herein.

All the features disclosed in this specification (including any accompanying claims, the drawing, and the abstract) and/or any steps in the method or process so disclosed, may be combined in any combination, except combinations where at least some of the features and/or steps are mutually exclusive.

Each feature disclosed in this specification (including in the accompanying claims, the drawing, and the abstract), may be replaced by alternative features serving the same or similar purpose, unless expressly stated otherwise. Thus, unless expressly stated otherwise, each feature disclosed is one example only of a generic series of equivalent or similar features.

Therefore, it will be understood that the foregoing description of representative embodiments of the invention have been presented only for purposes of illustration and for providing an understanding of the invention, and it is not intended to be exhaustive or restrictive, or to limit the invention to the precise forms disclosed. On the contrary, the intention is to cover all modifications, equivalents, and alternatives falling within the spirit and scope of the invention as expressed herein. As such, it is intended to cover the structures and methods described therein, and not only the equivalents or structural equivalents thereof, but also equivalent structures or methods. Thus, the scope of the invention is intended to include variations from the embodiments provided which are nevertheless described by the broad meaning and range properly afforded to the language used herein, or to the equivalents thereof.

What is claimed is:

1. A fuel-air pre-mix apparatus for a rotating ramjet engine assembly driving a shaft, said apparatus comprising:
   (a) a gas flow path housing having a relatively narrow, substantially annular outlet, said gas flow path housing having a longitudinal axis, said gas flow path housing defined by
      (i) an upstream housing end,
      (ii) a downstream housing end,
      (iii) an inner wall having an outer surface,
      (iv) an outer wall having an inner surface
      (v) said gas flow path housing convergent, at least in part, from said upstream end to said downstream end;
   (b) a plurality of low aerodynamic drag fuel supply structures disposed in said gas flow path housing, said fuel supply structures comprising a fuel inlet and a fuel injection outlet;
   (c) a plurality of vortex generators fixedly mounted within said gas flow path housing, and in proximity to said fuel injection outlets, said vortex generators mounted to protrude into said gas flow path housing and positioned so as to deflect a portion of said inlet carrier gas thus forming axially rotating vortices and thereby convert a portion of the axial momentum of said inlet carrier gas to transverse momentum, to thereby create mixing between said inlet carrier gas and said fuel,
   (d) said gas flow path housing thus receiving (A) a low pressure inlet carrier gas for carriage of an oxidant, and (B) fuel, and (C) within said gas flow path housing, mixing said fuel and said oxidant to produce a low pressure fuel-oxidant mixture for said rotating-ramjet engine assembly.

2. The apparatus as set forth in claim 1, wherein at least one of said plurality of fuel supply structures protrude inwardly into said gas flow path from said inner surface of said outer wall.

3. The apparatus as set forth in claim 1, wherein at least one of said plurality of fuel supply structures extends between said inner surface of said outer wall and said outer surface of said inner wall.

4. The apparatus as set forth in claim 1, wherein said fuel supply structures are disposed radially outward from said outer surface of said inner wall for a radial span R.

5. The apparatus as set forth in claim 1, wherein said fuel supply structures are disposed radially inward from said inner surface of said outer wall for a radial span R.

6. The apparatus as set forth in claim 5, wherein said fuel supply structures are disposed in a spoke-like radial orientation between said outer surface of said inner wall and said inner surface of said outer wall, each of said fuel supply structures having a radial span R.

7. The apparatus as set forth in any one of claims 1, 2, 3, 4, 5, or 6, wherein at least one of said plurality of said fuel supply structures comprises a low aerodynamic drag airfoil.

8. The apparatus as set forth in claim 1, wherein the distance between said outer surface of said interior wall and said interior surface of said outer wall, at any location along the longitudinal axis, is defined by a gap G, and for at least some portion along said longitudinal axis, said gap G decreases along said gas flow path housing, so as to decrease the cross-sectional area along said gas flow path housing.

9. The apparatus as set forth in claim 1, wherein the distance between said outer surface of said interior wall and said interior surface of said outer wall, at any location along the longitudinal axis, is defined by a gap G, and for at least some portion along said longitudinal axis, said gap G remains constant, so that the cross-sectional area of said gas flow path housing remains constant.

10. The apparatus as set forth in claim 1, wherein at least one of said plurality of low drag fuel supply structures comprises a low aerodynamic drag shaped airfoil body, said airfoil body
   (a) extending in downstream direction from a leading edge to a trailing edge, and
   (b) extending transversely along a central axis from an exterior end to an interior end, and
   (c) of sufficient thickness T to enclose and define within said airfoil body at least one fuel passageway, said at least one fuel passageway running from a fuel supply inlet to a fuel injection outlet.

11. The apparatus as set forth in claim 10, wherein each of said one or more vortex generators is affixed to an airfoil body.

12. The apparatus as set forth in claim 11, wherein each of said vortex generators comprises sufficient effective surface area protruding into said inlet gas flowstream to convert a preselected amount of axial momentum of said flowstream into transverse momentum.

13. The apparatus as set forth in claim 11, wherein at least one of said one or more vortex generators is triangular in shape.

14. The apparatus as set forth in claim 12, or in claim 13, wherein at least two of said one or more vortex generators are provided in pairs, and wherein said one or more vortex generators are mounted together in even numbered pairs.

15. The apparatus as set forth in claim 14, wherein said pairs of vortex generators are provided in opposing mirror image pairs.

16. The apparatus as set forth in claim 14, further comprising a base, and wherein said opposing units are both affixed to said base.

17. The apparatus as set forth in claim 14, wherein said opposing units and said base comprise an integral, one-piece vortex generator.

18. The apparatus as set forth in claim 16, wherein said base is trapezoidal.

19. The apparatus as set forth claim 18, wherein in said trapezoidal base comprises a narrow nose and a wide tail.

20. The apparatus as set forth in claim 1, wherein at least one of said plurality of vortex generators comprise a generally triangular shaped fin of height $V_H$.

21. The apparatus as set forth in claim 1, wherein at least one of said plurality of vortex generators comprise a generally triangular shaped fin having an acute trailing edge-nose-tip angle theta ($\theta$).

22. The apparatus as set forth in claim 21, wherein said angle theta ($\theta$) is approximately 16.5 degrees.

23. The apparatus as set forth in claim 1, wherein at least one of said plurality of vortex generators comprise a generally triangular shaped fin having an angle of incidence alpha ($\alpha$).

24. The apparatus as set forth in claim 23, wherein said angle of incidence alpha ($\alpha$) is approximately 45 degrees.

25. An apparatus for generating power as set forth in claim 1, or claim 2, wherein said at least one ramjet operates at an inlet velocity $M_0$ of approximately Mach 3.5.

26. A process for pre-mixing a fuel and an inlet carrier gas containing oxidant for the supply of a fuel-air mixture to a rotating ramjet engine assembly driving a shaft, said process comprising:
  (a) providing a fuel mixing housing, said housing comprising:
    (1) a gas flow path having a longitudinal axis, said gas flow path defined by
      (i) an upstream end,
      (ii) a downstream end,
      (iii) an inner wall having an outer surface, and
      (iv) an outer wall having an inner surface;
  (b) providing a plurality of low aerodynamic drag fuel supply structures disposed in fluid communication with said gas flow path, said fuel supply structures having fuel injection outlets;
  (c) providing a plurality of vortex generators fixedly mounted within said gas flow path;
  (d) introducing a carrier gas containing an oxidant into said gas flow path substantially along said longitudinal axis at low pressure and at a preselected velocity;
  (e) introducing a fuel into said fuel supply structures at a pre-selected pressure, and then injecting a pre-selected amount of said fuel at a pre-selected velocity into said carrier gas from said fuel injection outlets;
  (f) converting a pre-selected portion of the axial momentum possessed by said carrier gas moving at said preselected velocity into transverse momentum by creating axially rotating vortices with said vortex generators;
  (g) wherein the ratio of total transverse momentum to the total axial momentum results in a ratio of the rms concentration c' of said fuel to the average concentration c of said fuel in said carrier gas of about 0.1 or less.

27. The process as set forth in claim 26, wherein said concentration c' of said fuel to the average concentration c of said fuel in said carrier gas is about 0.08 or less.

28. The process as set forth in claim 26, wherein said concentration c' of said fuel to the average concentration c of said fuel in said carrier gas is about 0.06 or less.

29. The process as set forth in claim 26, wherein said fuel is supplied under low pressure, and wherein said low pressure is less than about 60 psig.

30. The process as set forth in claim 26, wherein said fuel is supplied under low pressure, and wherein said low pressure is less than about 30 psig.

31. The process as set forth in claim 26, wherein said fuel is supplied under low pressure, and wherein said low pressure is less than about 15 psig.

32. The process as set forth in claim 26, wherein said fuel is supplied under low pressure, and wherein said low pressure is less than about 5 psig.

33. The process as set forth in claim 26, wherein said carrier gas comprises air.

34. The process as set forth in claim 26, wherein said oxidant comprises oxygen.

35. The process as set forth in claim 26, wherein said fuel comprises natural gas.

36. The process as set forth in claim 26, wherein said fuel comprises gas from hydrocarbon drilling operations.

37. The process as set forth in claim 36, wherein said fuel comprises flare gas.

38. The process as set forth in claim 26, wherein said fuel comprises gas from hydrocarbon refining operations.

39. The process as set forth in claim 26, wherein said fuel comprises gas from hydrocarbon transport operations.

40. The process as set forth in claim 26, wherein said fuel comprises hydrogen.

41. The process as set forth in claim 26, wherein said fuel comprises landfill gas.

42. The process as set forth in claim 26, wherein said fuel comprises off-gas gathered from coal.

43. The process as set forth in claim 26, wherein said fuel comprises ventilation gas from a coal mine.

44. The process as set forth in claim 26, wherein said fuel gas is selected from the group consisting of (a) methane, (b) ethane, (c) propane, (d) butane, or (e) pentane.

45. The process as set forth in claim 26, wherein said fuel comprises propylene.

46. The process as set forth in claim 26, wherein said fuel comprises acetylene.

47. The process as set forth in claim 26, wherein said carrier gas is at or near ambient pressure.

48. Apparatus for generation of power, said apparatus comprising:
  (a) a fuel-air pre-mix housing for receiving an inlet carrier gas for carriage of an oxidant, and fuel, and for mixing said fuel and said oxidant to produce a fuel-oxidant mixture, said housing further comprising:
    (i) a gas flow path having a relatively narrow, substantially annular outlet, said gas flow path having a longitudinal axis, said gas flow path defined by
      (A) an upstream housing end,
      (B) a downstream housing end, (C) an inner wall having an outer surface,
(D) an outer wall having an inner surface, and
(E) said gas flow path convergent, at least in part, from said upstream end to said downstream end;
  (ii) a plurality of low aerodynamic drag fuel supply structures disposed in said gas flow path, each of said fuel supply structures having a fuel inlet and a fuel injection outlet;
  (iii) a plurality of vortex generators fixedly mounted within said gas flow path, and in proximity to said fuel injection outlets, said vortex generators mounted to protrude into said gas flow path and positioned so as to deflect a portion of said inlet carrier gas thus forming axially rotating vortices and thereby convert a portion of the axial momentum of said inlet carrier gas to transverse momentum, to thereby create mixing between said inlet carrier gas and said fuel;
(b) a rotor, said rotor rotatably secured to a high speed mounting base, said rotor having an axis of rotation, said rotor extending outwardly from said axis of rotation to an outer surface portion;
(c) a peripheral wall, said peripheral wall
  (i) positioned along said axis of rotation between said mixed gas inlet and a combustion exhaust gas outlet,
  (ii) positioned radially outward from said axis of rotation,
  (iii) positioned radially outward from said outer surface portion of said rotor, and
  (iv) comprising an inner peripheral wall surface portion;
(d) one or more ramjets, said one or more ramjets
  (i) each comprising an unshrouded compression portion located at said outer surface portion of said rotor,
  (ii) said unshrouded compression portion cooperating with at least a portion of said inner peripheral wall surface portion to compress said fuel-oxidant mixture between said one or more ramjets and said at least a portion of said inner peripheral wall surface portion,
  (iii) operable at a speed, with respect to said fuel-oxidant mixture, of at least Mach 1.5.

49. The apparatus as set forth in claim 48, wherein said rotor further comprises one or more strakes, each of said one or more strakes accompanying each of said one or more ramjets, wherein each of said one or more strakes
extends substantially radially outward from at least a portion of said outer surface portion of said rotor to a point adjacent said interior peripheral wall surface portion,
said one or more strakes effectively separating said fuel-oxidant mixture from said hot combustion gas when said one or more ramjets oxidize said fuel in said mixed inlet gas to create hot combustion gases which propulsively exit from said one or more ramjets to create a thrust force, thereby causing rotation of said rotor.

50. The apparatus as set forth in claim 49, further comprising an output shaft operatively connected to said rotor.

51. The apparatus as set forth in claim 48, wherein each of said one or more ramjets further comprise a partially unshrouded outlet nozzle, and wherein said one or more ramjets utilize at least a portion of said interior peripheral wall surface portion for decompression of said escaping hot combustion gases.

52. An apparatus for generating power as set forth in claim 48, or in claim 51, wherein said at least one ramjet operates at an inlet velocity $M_0$ of between about Mach 1.5 and Mach 2.0.

53. An apparatus for generating power as set forth in claim 48, or claim 51, wherein said at least one ramjet operates at an inlet velocity $M_0$ of at least Mach 2.0.

54. An apparatus for generating power as set forth in claim 48, or claim 51, wherein said at least one ramjet operates at an inlet velocity $M_0$ of at least Mach 2.5.

55. An apparatus for generating power as set forth in claim 48, or claim 51, wherein said at least one ramjet operates at an inlet velocity $M_0$ of at least Mach 3.0.

56. An apparatus for generating power as set forth in claim 48, or claim 51, wherein said at least one ramjet operates at an inlet velocity $M_0$ between Mach 3.0 and Mach 4.5.

57. The apparatus of claim 48, wherein said rotor comprises at least one central disc.

58. The apparatus of claim 57, wherein said at least one central disc is tapered.

59. The apparatus of claim 57, wherein said at least one central disc comprises an ultra-high strength steel.

60. The apparatus of claim 57, wherein said at least one central disc comprises a metal matrix composite.

61. The apparatus of claim 60, wherein said metal matrix composite comprises titanium.

62. The apparatus of claim 57, wherein said at least one central disc further comprises a radial edge portion, and wherein said rotor further comprises detachably affixable rim segments, said detachably affixable rim segments affixable along said radial edge portion of said at least one central disc.

63. The apparatus as set forth in claim 62, wherein said detachably affixable rim segments comprise titanium.

64. The apparatus as set forth in claim 57, wherein each of said one or more ramjets further comprises detachably affixable ramjet thrust portions.

65. The apparatus as set forth in claim 64, wherein said detachably affixable ramjet rim portions comprise titanium.

* * * * *